Aug. 6, 1940.                L. KIRSCHBRAUN                2,210,209
                          COMPOSITION SHINGLE
                         Filed Nov. 3, 1939           3 Sheets-Sheet 1
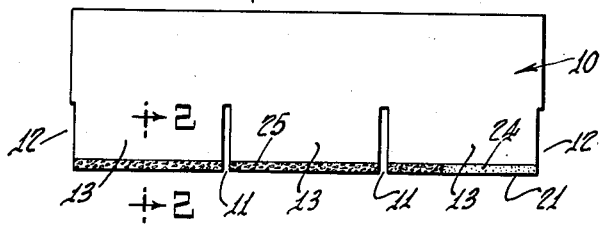
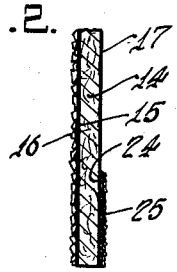
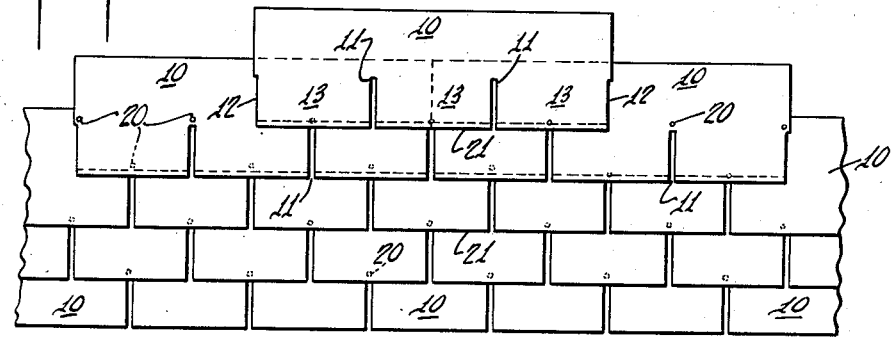
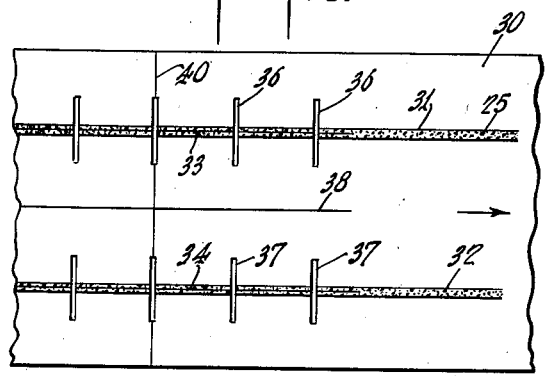
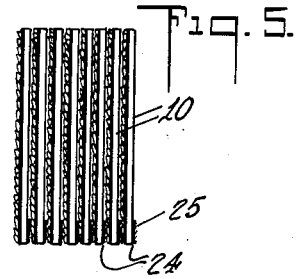
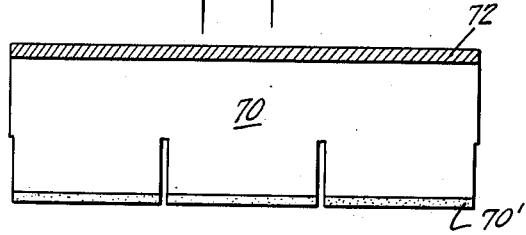
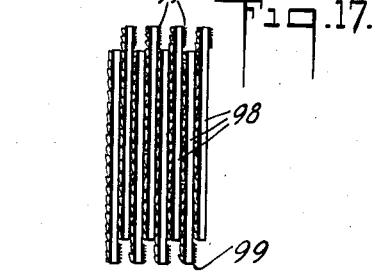
INVENTOR.
Lester Kirschbraun
BY Samuel Stearman
ATTORNEY.

Aug. 6, 1940.  L. KIRSCHBRAUN  2,210,209
COMPOSITION SHINGLE
Filed Nov. 3, 1939   3 Sheets-Sheet 2

INVENTOR.
Lester Kirschbraun
BY
Samuel Stearman
ATTORNEY.

Aug. 6, 1940. L. KIRSCHBRAUN 2,210,209
COMPOSITION SHINGLE
Filed Nov. 3, 1939 3 Sheets-Sheet 3

INVENTOR.
Lester Kirschbraun.
BY
Samuel Stearman
ATTORNEY.

Patented Aug. 6, 1940

2,210,209

UNITED STATES PATENT OFFICE 2,210,209

COMPOSITION SHINGLE

Lester Kirschbraun, New York, N. Y., assignor to The Patent and Licensing Corporation, New York, N. Y., a corporation of Massachusetts Application November 3, 1939, Serial No. 302,642

17 Claims. (Cl. 108—7)

This invention concerns improvements in composition shingles and more especially in so-called asphalt shingles of the flexible type.

When flexible asphalt shingles are applied to a roof or side wall in the usual manner, i. e., in successive courses with the butts of the shingles of one course partially overlapping and left free of the shingles of the immediately preceding course, there is a tendency for the butts to become elevated more or less under the action of very high winds and thus not only give access of rain or moisture to the underlying roof or sheathing structure, but more serious than that is the danger of the butt being torn away under the continued action of these high winds. The tendency for the free butts of shingles to be elevated by the wind is especially marked in the case of shingles which have a relatively high limpness or flexibility in the region through which nails are applied for fastening the shingles to the underlying structure, since in such cases the free butts or exposed portions of the shingles extending below the points at which the shingles are nailed can readily become elevated upon flexing of the shingles along the nailing lines. The flapping of the free butts caused by the continued action of high winds results in the shingles being torn through or around the nail holes, in consequence of which there is danger that the butt or exposed portion will finally break or tear away completely. This problem is therefore particularly acute in those territories, of which southwestern Texas is typical, where relatively high winds prevail.

The principal object of the invention is the provision of asphalt shingles of the character described so designed as to reduce or eliminate the tendency of the free butts or exposed portions of the shingles to be lifted or elevated from the underlying surface under the action of winds particularly of high force and of continuing nature.

I am aware that there have been instances where asphalt composition shingles have been found to have their free butts sealed down to the underlying surface through the adhesive action of asphalt saturant exuded from the felt base of the shingles under the action of the heat of the sun. In practice, however, this exudation cannot be controlled and in any event is undesirable for various reasons, the principal of which perhaps is the deterioration of the felt base resulting from the loss of saturant by exudation.

A more specific object of the invention therefore is to provide shingles of the class described with positively acting means to render them capable of becoming self-adhered at a wide range of roof temperatures induced by the heat of the sun, to an adjacent underlying shingle when they are laid on a roof or side wall, within a very short period of time after they are applied to the roof or side wall.

The problem of securing a positive and certain sealing action as above stated, in shingles of the class described, is compounded by reason of the fact that materials that will thus give the desired sealing effect on the roof, may cause sticking of one shingle to another when the shingles are packaged in bundles for storage and shipment, because roof temperatures of the order sufficient to bring about the sealing effect approach, and tend to overlap, the packaging temperatures; and the problem is additionally compounded by the fact that when the shingles are in packages during storage and shipment, they are subjected to pressures much higher than any pressure that prevails in the laid arrangement of the shingles on a roof.

Accordingly, another object of the invention is to provide a self-adhering shingle of the character described in such a form as will permit of the shingles being stored and shipped in bundles without danger of the adhering means causing the shingles of the bundle to stick to one another and yet not interfere with the proper functioning of the adhering means to effect a sealing down of the butt of each shingle to its underlying surface when the shingles are applied in use.

Further objects and advantages of the invention will become more apparent from the detailed description below and from the accompanying drawings in which:

Fig. 1 is a plan view of one well-known form of shingle, showing one embodiment of the invention utilized in connection therewith;

Fig. 2 is an enlarged cross-sectional view taken along the line 2—2 of Fig. 1;

Fig. 3 illustrates an assembly of the shingles of Fig. 1 applied in a number of courses, as on a roof or side wall;

Fig. 4 is a plan view of a sheet of material illustrating steps in the manufacture of a shingle such as shown in Figs. 1 to 3;

Fig. 5 is a view illustrating one manner in which the shingles of Fig. 1 may be assembled in bundles for storage and shipment;

Fig. 12 is a plan view of a shingle to that of Fig. 1, but embodying yet another variant form of the invention;

Fig. 17 is a view showing another arrangement in bundles of shingles embodying the invention.

Figure 6:
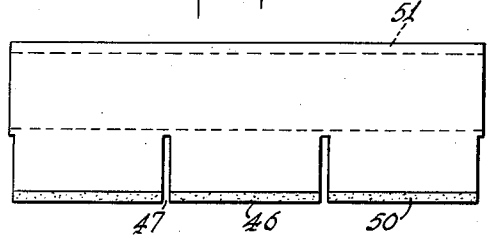
Fig. 6 is a plan view of the rear or under face of another well-known type of shingle, embodying the invention in a variant form.

In the drawings, the invention is shown as embodied in several well-known forms of so-called asphalt shingles, in order to facilitate an understanding of the invention in its more practical adaptations. Thus, in Figs. 1 to 5, there is shown a shingle in the form of the well-known square butt strip. As there shown, the strip comprises a body portion 10 having spaced transverse slots 11 and notches 12 extending inwardly from the lower horizontal edge of the strip for a distance corresponding to the depth of exposure of the strip in use. The notches 12 are of a width approximately half the width of the slots 11, these slots and notches defining tabs 13 which, when the strips are laid in overlapping courses, simulate the appearance of individual shingles. These strips comprise a base 14 of fibrous felt saturated with asphalt or similar waterproofing material. The outer or exposed face of the shingle is provided with a weather-protective layer 15 of high melting point asphalt or the like in which is partially embedded a granular mineral surfacing 16, such as crushed slate or the like. The opposite or under face of the strip is provided with a relatively thin layer 17 of waterproofing material, preferably asphalt of the same character as that composing the layer 15, material such as mica or talc being usually applied to layer 17. When the shingle strips as thus described are applied to a roof or side wall in overlapping courses, the strips in each course are usually nailed to the supporting structure by nails, as indicated at 20 in Fig. 3, located a short distance above the upper ends of the tab-defining notches or slots 11, 12, the shingles of each course overlapping the upper portion of the shingles in the preceding course and having their butt edges 21 in registry with the upper ends of the tab-defining slots in the shingles of the preceding course. The tabs 13 are thus left free and can be lifted from the surface of the underlying shingles under the action of high winds which, when of sufficient intensity and duration, cause the shingles to be cut or torn by the heads of the nails by which they are secured to the roof, leading eventually to the tabs being torn or broken off entirely.

According to the invention, the shingles are provided with means for bringing about an effective sealing of the tabs to the underlying surface, within a relatively short time after the shingles are laid in place on the roof. I have found that this can be accomplished by making use of certain asphalts whose adhesive qualities are energizable or activated at temperatures of the order of 125° F. and above. Thus the heat sensitivity of these asphalts may be utilized to bring about an effective sealing down of the tabs at temperatures usually prevailing on a roof during warm weather in the northerly climates and through most of the seasons of the year in southern climates. This heat sensitivity is not possessed by asphalts that are required to be employed for the weather-protective coating layers 15 and 17. By means of the special heat sensitive asphalts, however, I have found it possible, in a very inexpensive manner, to make shingles which are capable of becoming automatically sealed down along their otherwise free butts or exposed sections, with reasonable promptness after they are applied in use. For this purpose, I have used asphalt having the following properties:

| | |
|---|---|
| Melt point_____° F__ | 160–170 |
| Penetration at 32° F_____ | 3 |
| Penetration at 77° F_____ | 5–8 |
| Penetration at 115° F_____ | 20–25 |
| Viscosity, Saybolt furol at 300° F__secs__ | 300–330 |
| Viscosity, Saybolt furol at 350° F__secs__ | 75–80 |

It will be understood, of course, that the properties of the asphalt above set forth are not to be taken in a restrictive sense, and that other asphalts and similar bitumens which are sufficiently heat sensitive at normal roof temperatures to be actively adhesive may be employed.

In the embodiment of the invention illustrated in Figs. 1 to 5, a heat sensitive asphalt of the character indicated is applied to the bottom face of the shingle strip in the form of a relatively narrow ribbon or band 24 extending along the butt edge thereof. In practice I have found that the band 24 may suitably be of a width of approximately one-half inch. The band 24 being applied to the under face of the shingle will contact the upper face of the shingles in the underlying course when they are assembled in the manner illustrated in Fig. 3 and will effect a sealing of the otherwise exposed free tabs to this underlying surface as soon as the roof temperature is high enough to energize the adhesive properties of the asphalt composing the band 24. With asphalts having a heat sensitivity such as characterizes the asphalt above set forth, this will occur at roof temperatures of about 125° F. Heat sensitive asphalts as typified by the asphalt above described is characterized by the property of rapidly developing cold flow with ascending temperatures. The ribbon or band 24 may vary in thickness over a considerable range. The thickness should be sufficient to furnish an amount of asphalt ample for firmly sealing down the tabs when the adhesive qualities of the band become energized. On the other hand, the thickness of the band should not be so excessive as might cause the asphalt to flow down over the face of the underlying shingle. I have found in practice a thickness of from say 0.005″ to 0.015″ to be satisfactory.

Since the asphalt employed for the band or ribbon 24 is heat sensitive to the degree indicated and is also pressure sensitive to an extent, means are provided, in accordance with the invention, to prevent the shingles from sticking to one another in the bundles in which they are packaged for storage and shipment from the manufacturer to the user. In other words, while the sealing means must be sufficient to cause a firm sealing down of the shingles to the surface of the underlying shingles within a reasonably short time after they are applied, yet its heat and pressure sensitivity must be counteracted or rendered unable to cause sticking together of the shingles during the period when they are in bundles and stacked in storage and shipment. According to the embodiment shown in Figs. 1 to 5, this is accomplished by covering or coating the ribbon or band 24 with a fugitive material which will be decomposed or otherwise removed as by sublimation, or by being dissolved by dew or by the first rain that occurs, after the shingles are laid in place on a roof or side wall. More specifically, I apply to the band 24 a layer 25 of commercial salt crystals. These salt crystals are preferably of such a grading that the particles are for the most part larger than the thickness of the band 24, as otherwise the material of the band 24 might slowly flow between the salt crystals during storage and give rise to objectionable sticking of one shingle to another in the bundles. Thus, in the case of the band 24 having a thickness of 0.010", the salt crystals may be of a grading such that 55% of them are larger than 0.012". Specifically the grading of the salt crystals used for surfacing the band 24 when of a thickness of 0.010" may be as follows:

| Mesh | Size of screen opening | Percent retained |
|---|---|---|
|  | Inches |  |
| 28 | 0.0232 | Trace |
| 35 | 0.0164 | 6.5 |
| 48 | 0.0116 | 48.7 |
| 65 | 0.0082 | 24.4 |
| 100 | 0.0058 | 15.8 |
| Pass 100 | | 4.8 |

By means of the layer of salt crystals as above described, applied to the band 24, I have found it possible to prevent the material of the band from causing the shingles to stick to one another while in bundles, even when the shingles are packaged directly from the machine at temperatures of about 110° F. and the bundles are stored for extended periods of time and under as much as 450 pounds weight on a bundle of shingles, which are say 36" long and 12" wide. Since each bundle of shingles weighs about 70 to 80 pounds, it becomes possible to stack the bundles in storage and shipment in stacks of six or seven bundles each, without danger of the shingles sticking to one another in any of the bundles.

While the layer 25 of salt crystals is thus effective to prevent the heat and pressure energizable adhesive qualities of the asphalt from bringing about adhesion of shingles to one another in the bundles during shipment and storage, yet when the shingles are applied on a roof or side wall in the usual manner as illustrated in Fig. 3, the water that creeps upwardly between the shingles with the first moderately heavy rain that occurs after the shingles are applied will dissolve the salt crystals from the surface of the band 24. The first occurrence of a substantial amount of dew may also be sufficient to effectually dissolve these salt crystals. In either case, however, as soon thereafter as a temperature of the order of 125° F. occurs on the roof, as will be the case on the average warm day during late spring, throughout the entire summer and early fall in northerly climates and during practically any season of the year in southerly climates, the adhesive qualities of the band 24 will become energized or activated sufficiently to seal the tabs down to the underlying shingles. Thus the shingles will be securely sealed down in most instances very shortly after they are applied and this sealing down will in all cases in time be sufficiently firm so that the exposed butts or tabs of the shingles cannot be elevated by high wind. In tests which I have conducted with shingles prepared as above described, I have found that after a moderate rain, followed by a warm, clear day, the shingles became sealed down with a firmness sufficient to prevent elevation of the butts under the force of an air blast emitted from an orifice of one-quarter inch diameter at 50–60 pounds pressure. This blast is judged to be about equivalent to a 70 or 80 mile gale.

In lieu of salt crystals as the fugitive material to prevent sticking together of the shingles in their bundles, other substances readily soluble in water, such as glycerin, or crystals of sugar, ammonium chloride, trisodium phosphate or the like, may be applied to the ribbon or band 24. When material such as ammonium chloride is employed as the fugitive surfacing for the band 24 in accordance with the invention, the material may become removed in whole or in part from the surface of the band 24 by sublimation or by decomposition after the shingles are applied on the roof, even before the occurrence of substantial rain.

The band of adhesive and the fugitive surfacing for the band may be applied either before or after the shingles are cut from the parent sheet. Preferably, this treatment is applied to the parent sheet before the shingles are severed therefrom. One method of procedure is diagrammatically illustrated in Fig. 4, wherein the numeral 30 indicates the parent sheet after the felt base of which it is composed has been saturated, coated on one surface with high melting point asphalt (constituting the layer 15 of the finished strip), surfaced with mineral granules (constituting the layer 16 of the finished strip) partially embedded in the coating layer and also coated on its opposite surface with a thin layer of similar asphalt coating (constituting the layer 17 of the finished strip) to which talc or mica is applied. Up to this point the operations are quite conventional and need not be further described. In the particular form illustrated the parent sheet is of a width sufficient to produce four lanes of shingle strips of the form shown in Fig. 1. By means of suitable print wheels (not shown) supplied with the heat sensitive asphalt in molten state, bands 31, 32 thereof may be deposited lengthwise of the sheet, the center of each of these bands coinciding with the lines 33, 34 along which the sheet will subsequently be slitted to form the butt edges of each pair of opposing lanes of shingles formed across the width of the sheet. Each of the bands 31, 32 are of a width approximately twice the width of the band 24 on the finished shingle. Immediately after these bands are thus deposited on the sheet, the fugitive material may be applied thereto in any convenient fashion. In the case of crystal material such as salt, this may be showered onto the bands and caused to become partially embedded therein. In the case of a liquid fugitive substance such as glycerin, this may be sprayed or applied to the bands 31, 32 by means of another set of print wheels. After the bands of adhesive and the fugitive surfacing material have been applied to the sheet, the latter may be formed with rows of slots 36, 37 to constitute the tab-defining slots of the finished strips. The slots of each row preferably extend transversely to equal distances on opposite sides of each of the bands 31, 32. Simultaneously with or subsequent to the formation of the slots 36, 37, the sheet may be slitted along the center lines 33, 34 of the bands and also along the center line 38 of the sheet and transversely as at 40 forming the end edges of the strips at spaced intervals along the length of the sheet. This slotting of the sheet and the cutting of the strips therefrom may be performed by the conventional devices used for this purpose in present practice. The finished strips as delivered from the cutting device may be assembled in bundles in which they are arranged face to back, the band 24 with its layer of fugitive surfacing 25 on each shingle placed against the mineral surfacing layer 16 of the adjacent shingle in the bundle, as indicated in Fig. 5. If desired, the shingles of the bundle may be arranged in several groups with the shingles of one group reversed, end for end, in relation to the shingles of the adjacent group.

Another embodiment of the invention is illustrated in Figs. 6 to 11 in conjunction with another well known form of flexible asphalt composition shingle. This is a so-called thick butt shingle consisting of a base 42 of saturated felt, provided on its upper surface with a layer of high melting point asphalt 43 in which is partially embedded a surfacing of mineral grit 44, the butt end of the shingle being provided with an overlay or butt thickening layer of high melting point asphalt 45 extending upwardly from the butt edge 46 for a distance slightly above the upper ends of the tab-defining slots 47, this secondary coating layer 45 being surfaced with a layer 48 of mineral granules. The opposite, i. e. the bottom, face of the shingle is provided with a comparatively thin coating of high melting point asphalt 49 to which finely divided talc or mica is applied. Shingles of this type, particularly in those instances where the layers of coating 43 and mineral surfacing 44 are required to be relatively thin, have often proved troublesome on account of the increased tendency of their butts to be elevated by strong winds, owing to the relative flexing of the shingles when they are nailed through the thin section, i. e., above the upper margin of layers 45, 48.

Figure 7:
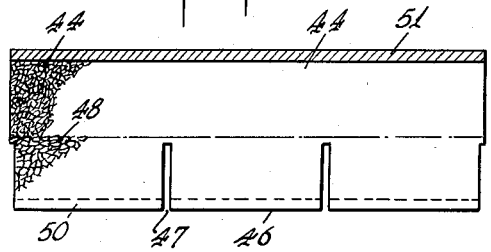
Fig. 7 is a plan view of the front or upper face of the shingle of Fig. 6.
Figure 11:
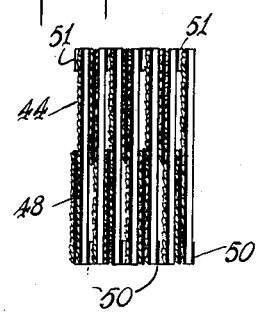
Fig. 11 shows the manner in which the shingles of Figs. 6 to 10 may be arranged in bundles for storage and shipment.

Accordingly, to the bottom face of the shingle along its butt edge 46, there is applied a narrow ribbon 50 consisting of a heat and pressure sensitive asphalt of the character above indicated. In this embodiment of the invention, instead of using a fugitive material as a surfacing over the ribbon 50, there is employed a band 51 of material such as clay or clay mixed with small amounts of casein, graphite or the like, applied in the form of a suspension in water, to the upper face of the shingle along the upper edge thereof as indicated in Fig. 7, the band 51 being of a width approximately the same as the width of the band 50. Shingles prepared in this way may be packaged for shipment in bundles as illustrated in Fig. 11. As there shown, adjacent shingles in the bundle are in alternately reversed position so that the band 50 of each shingle in the bundle is in contact with the band 51 of the adjacent shingle. In this manner, the bands or ribbons 51 (shown somewhat exaggerated for the sake of clarity) of the parting material, such as clay, prevent the bands 50 of the adhesive from sticking to the surface of the adjacent shingles in the bundle under the temperatures and pressure to which they may be subjected while in bundles.

Figure 8:
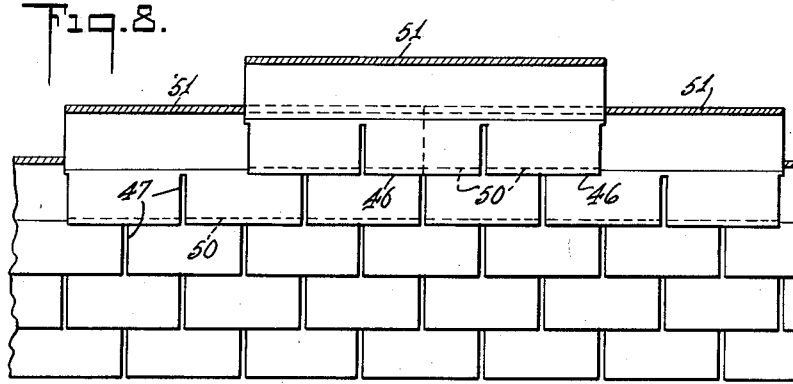
Fig. 8 is an assembly view similar to Fig. 3 but showing the shingles of Figs. 6 and 7 applied in successive courses.
Figure 9:
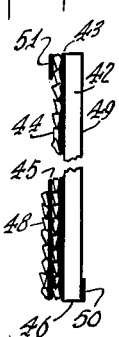
Fig. 9 is a fragmentary enlarged cross-section of the shingle of Figs. 6 and 7.
Figure 10:
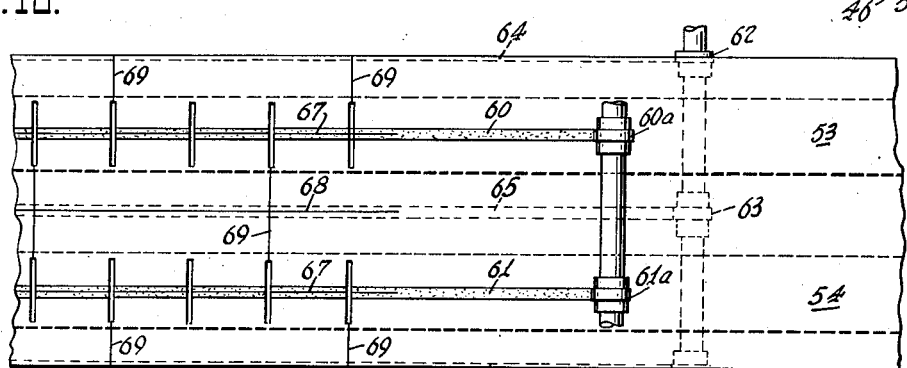
Fig. 10 is a plan view of a sheet of material illustrating stages in the manufacture of the shingle of Figs. 6 to 9.

When this form of shingle is applied in successive courses to a roof or side wall as illustrated in Fig. 8, the heat sensitive character of the adhesive bands 50 will effect sealing down of the exposed sections or tabs of the shingles to the underlying surface as soon as the roof temperature reaches the order of 125° F. The bands 51 of the parting medium which serve during storage and shipment of the shingles to prevent sticking together of adjacent shingles in the bundles, being located along thhe upper margin of the overlapped portions, are covered and entirely concealed by the overlying shingles in the next succeeding course in the laid arrangement of the shingles.

In producing the shingles of the form shown in Figs. 6 to 9, customary procedure may be followed for preparing the parent sheet, including the steps of saturating the fibrous felt base with asphalt, coating and surfacing one face of the saturated sheet with high melting point asphalt and mineral surfacing to constitute the layers 43, 44 respectively, applying a layer of coating and a surfacing of talc or other non-adhesive material 49 to the opposite face of the sheet, applying the overlay layers of high melting point asphalt 45 and 48 in the form of bands 53, 54 to the layer of mineral surfacing on the first-named face and surfacing these bands with mineral surfacing. To the parent sheet as thus prepared (see Fig. 10), bands 60, 61 of the heat sensitive adhesive may be applied as by means of suitable printing wheels 60ª, 61ª designed and located to apply the bands to the face of the sheet carrying the layer of coating and surfacing 49 (shown facing upwardly in Fig. 10) centrally of the butt thickening layers 53, 54 on the opposite face (shown facing downwardly in Fig. 10) of the sheet. At the same time, clay in the form of a slurry or suspension in water and mixed, if desired, with smaller amounts of material such as casein, graphite or the like, is applied to the mineral surfaced face of the sheet by means of suitable rolls or wheels 62, 63, to form streaks or bands 64 along the opposite margins of the sheet and an intermediate band 65 which is double the width of each of the bands 64 along the longitudinal center line of the sheet. Since the adhesive for the bands 60 and 61 is applied while in molten adhesive state, suitable cooling means, such as a draft of cold air, may be provided to effect very rapid cooling of these bands to a degree sufficient to render them non-adhesive, or these bands may be lightly coated with soap solution, in order to permit the further travel of the sheet through the machine without sticking to any of the instrumentalities, such as the guide rolls or cutting cylinders, etc. Likewise, any suitable means may be employed to assist in drying of the clay slurry bands 64, 65, although this may not be necessary since the sheet is hot at the time these bands are applied.

The sheet may then be slotted by means of the usual cutting devices to form the tabs of the finished shingle strips, slit longitudinally along the middle of the bands 60, 61 as indicated at 67 and along the longitudinal center line of the sheet as indicated at 68, and severed transversely at spaced intervals as indicated at 69 to cut off the shingle strips in desired length. The severed shingles may be then gathered, in any convenient fashion, into bundles in which they are arranged as indicated in Fig. 11, directly as the severed shingles are delivered from the cutting devices.

Figure 12A:
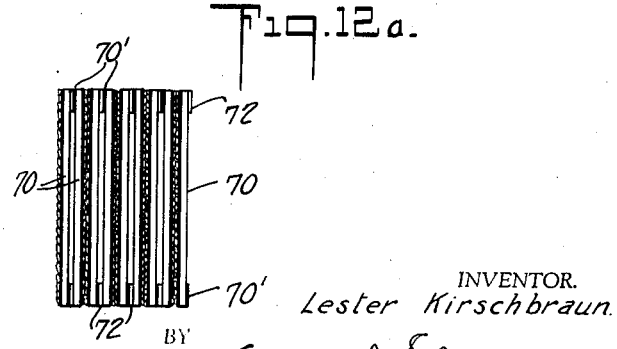
Fig. 12a shows the manner in which the shingles of Fig. 12 may be arranged in bundles.
Figure 13:
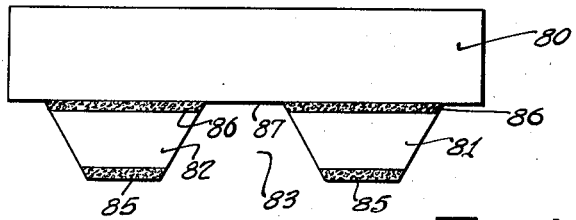
Fig. 13 is a plan view of another form of shingle made in accordance with the invention.

Fig. 12 shows a shingle 70 of the usual asphalt coated and mineral surfaced type similar to that of Fig. 1, embodying the invention in another form. The band of heat and pressure sensitive asphalt 70' is applied to the bottom face of the shingle along the butt edge thereof as in the forms previously described. The band is prevented from causing sticking of the shingles to one another in the bundles by means of a streak or band 72 of clay or similar parting substance applied along the upper edge of the shingle to the bottom face thereof (instead of to the top face as in the form of Figs. 6 to 11). In this embodiment of the invention, the shingles are arranged in the bundles in the manner illustrated in Fig. 12ª, wherein the shingles are arranged in pairs back to back and face to face, the shingles of each pair being alternately reversed end for end so that the band 70' on each shingle will be in contact with the band 72 of the other shingle of the pair which are placed back to back in the bundle.

Figure 14:
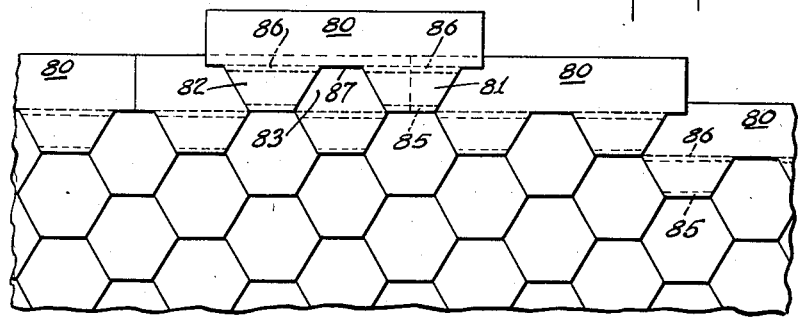
Fig. 14 is an assembly view showing shingles of Fig. 13 applied in courses.
Figure 15:
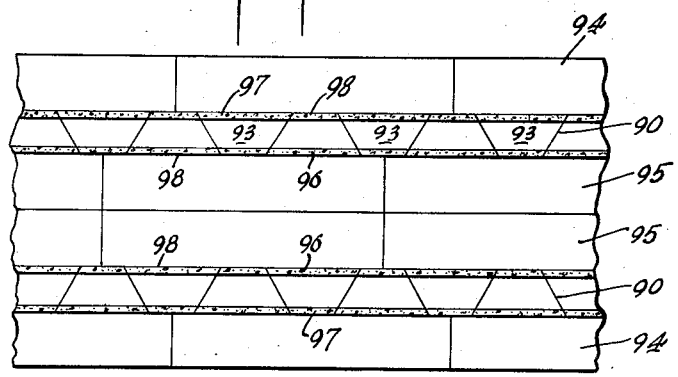
Fig. 15 is a plan view of a parent sheet showing stages in the manufacture of the shingle of Fig. 13.
Figure 16:
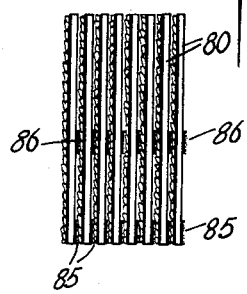
Fig. 16 illustrates a number of the shingles of Fig. 14 as arranged in a bundle for storage and shipment.

In Figs. 13 to 16, I have illustrated an embodiment of the invention in connection with shingle strips of the so-called hexagonal type, comprising a body portion 80 and semi-hexagonal tabs 81, 82 spaced from one another by reversed semi-hexagonal spaces 83 and from each end of the strip by notches corresponding in size and shape to one-half the spaces 83. It will be understood that this shingle, in its customary form, is made of flexible fibrous felt saturated with asphalt or similar waterproofing material and provided on its upper or exposed face with weather-protective layers of high melting point asphalt and mineral surfacing and on its bottom face with a relatively thin layer of similar asphalt surfaced with mica, talc or the like. The bottom or under face of the tabs 81 and 82 are each provided with a ribbon or band 85 of the heat and pressure sensitive asphalt extending along the lower margin of the tabs and being of a width of say one-half to one inch. These bands, as in the embodiment of the invention illustrated in Figs. 1 to 5, may be surfaced with a fugitive material functioning to prevent sticking together of the shingles while in bundles, but which will readily disappear under the action of rain or moisture when the shingles are applied to a roof as shown in Fig. 14, and permit the bands 85 to effect sealing of the tabs to the underlying surface when the roof temperature has reached a point sufficient to energize the adhesive qualities of the bands 85. In this form of shingle, the under face of the tabs also carry bands 86 of the heat energizable adhesive and the surfacing of fugitive material therefor. These bands 86 which are of a width equal to the width of the bands 85 and extend downwardly into the area of the tabs from the bottom edge 87 of the body portion of the strip are not required to secure the sealing down effect, but rather result from the particular manner in which, for the sake of economy, this hexagonal type shingle is normally cut from the parent sheet, although the bands 86 will contribute to a more effective sealing down of the tabs under the conditions herein referred to. As will be observed from Fig. 15, the cutting of these shingles is accomplished in the most economical manner by slitting the sheet along zigzag lines 90 so that the material 93 constituting the tabs of one lane 94 of strips cut from the sheet forms the spaces between the tabs of an adjacent lane 95 of strips cut from the sheet. Since it is more expeditious to form the bands 85 by applying the adhesive as continuous ribbons, the latter are located, as indicated at 96, in such position as to constitute the band 85 of the finished strips formed from lanes 94 and, as indicated at 97, in such position as to constitute the bands 85 of the finished strips formed from the lanes 95. Thus, the portions of the bands 96, 97 applied along those areas of the sheet between the lengthwise cuts 98 constituting the butt edges of the finished strips will appear in the form of the bands 86 in the finished strips if the bands 96, 97 are applied in a continuous manner. The shingles of Fig. 13 cut from the sheet after the bands 96, 97 of the adhesive and the surfacing of fugitive material have been applied thereto, as illustrated in Fig. 15, may be assembled in bundles directly as they are delivered from the cutting mechanism. The shingles may be arranged in bundles as shown in Fig. 16, the mineral surfaced or top face of the shingles being in contact with the opposite or bottom face of the adjacent shingles carrying the bands 85, 86 without danger of the bands 85, 86 giving rise to sticking together of the shingles in the bundle. The shingles may be arranged in the bundle with the tabs of all the shingles in the bundle facing in the same direction, or in groups each composed of a number of shingles, the shingles of each group having the tabs facing in the same direction and the tabs of one group being reversed end for end with respect to the tabs of an adjacent group.

The invention may also be practiced without using a surfacing of a fugitive material over the band of the heat-sensitive asphalt or films of a parting substance applied to the shingle in order to prevent sticking together of adjacent shingles when they are packed in bundles. One such embodiment of the invention is illustrated in Fig. 17. As there shown, sticking together of adjacent shingles in the bundle may be prevented by arranging the adjacent shingles 98 in the bundle in staggered or off-set positions, that is to say, with the margin of each shingle which carries the band 99 of the heat-sensitive asphalt, off-set outwardly from the edge of the adjacent shingle in the bundle for a distance equal to or even slightly more than the width of the band, the adjacent shingles being also alternately reversed end for end in the bundle.

I claim:

1. In a flexible shingle of the type which is laid with its exposed butt normally free to be elevated by wind, the improvement which comprises a layer of asphalt applied to one surface of the butt portion of the shingle, said asphalt being relatively non-adhesive at normal atmospheric temperatures, but sufficiently heat sensitive to have strong adhesive properties at temperatures of the order of 125° F., said layer being located in a position to effect adhesion of the said butt portion to its underlying surface when a number of said shingles are laid in overlapping courses and subjected to temperatures sufficient to energize the adhesive qualities of the asphalt as aforesaid.

2. A flexible shingle of the asphalt composition type and of a form in which its exposed butt is normally free to be elevated by wind when a number of such shingles are laid in overlapping courses, said shingle having a layer of asphalt applied to one surface of the butt portion of the shingle, said asphalt being relatively non-adhesive at normal atmospheric temperatures, but capable of having its adhesive properties energized at temperatures of the order of 125° F., said layer being located in a position to effect adhesion of the said butt portion to its underlying surface when a number of said shingles are laid in overlapping courses and subjected to a temperature sufficient to energize the adhesive qualities of the asphalt as aforesaid, and means associated with said layer of asphalt to prevent the same from causing sticking together of one such shingle to another while packed in bundles during storage and shipment without interfering with said adhesion when the shingles are laid in overlapping courses.

3. A shingle as defined in claim 2, wherein the means to prevent the shingles from sticking together while in bundles comprises a fugitive material applied to said layer of asphalt, said fugitive material being of a character to become readily removed from said layer under the action of rain or moisture when a number of the shingles are applied in overlapping courses to a roof or the like.

4. A shingle as defined in claim 2, wherein the means to prevent the shingles from sticking together while in bundles comprises a layer of crystals of common salt applied to the said asphalt layer.

5. A shingle as defined in claim 2, wherein the means to prevent the shingles from sticking together while in bundles comprises a film of a parting substance applied to one of the surfaces of the shingle in a position to be in contact with said layer of asphalt on an adjacent shingle in said bundle.

6. A flexible shingle of the asphalt coated and mineral surfaced type and of a form in which its exposed butt is normally free to be elevated by wind when a number of such shingles are laid in overlapping courses, said shingle having a narrow band of a heat-sensitive asphalt on the bottom face of said butt portion adjacent the lower edge thereof, the said asphalt being relatively non-adhesive at normal atmospheric temperatures, but sufficiently heat sensitive to have strong adhesive properties at temperatures of the order of 125° F., whereby when a number of said shingles are applied to a roof or other surface in overlapping courses the said adhesive properties of the asphalt will become activated promptly upon the occurrence of temperatures of the order stated, to effect sealing down of the said butt portion to its underlying surface.

7. A flexible shingle of the asphalt coated and mineral surfaced type and of a form in which its exposed butt is normally free to be elevated by wind when a number of such shingles are laid in overlapping courses, said shingle having a narrow band of a heat-sensitive asphalt on the bottom face of said butt portion adjacent the lower edge thereof, the said asphalt being relatively non-adhesive at normal atmospheric temperatures, but sufficiently heat sensitive to have strong adhesive properties at temperatures of the order of 125° F., whereby when a number of said shingles are applied to a roof or other surface in overlapping courses the said adhesive properties of the asphalt will become activated promptly upon the occurrence of temperatures of the order stated, to effect sealing down of the said butt portion to its underlying surface, said band being covered with a layer of a fugitive material to prevent sticking together of adjacent shingles when a number of such shingles are packed in bundles for storage and shipment, said fugitive material being of a character to be readily washed away by the action of rain or moisture when a number of said shingles are applied in overlapping courses to a roof or the like.

8. A flexible shingle of the asphalt coated and mineral surfaced type and of a form in which its exposed butt is normally free to be elevated by wind when a number of such shingles are laid in overlapping courses, said shingle having a narrow band of a heat-sensitive asphalt on the bottom face of said butt portion adjacent the lower edge thereof, the said asphalt being relatively non-adhesive at normal atmospheric temperatures, but sufficiently heat sensitive to have strong adhesive properties at temperatures of the order of 125° F., whereby when a number of said shingles are applied to a roof or other surface in overlapping courses the said adhesive properties of the asphalt will become activated promptly upon the occurrence of temperatures of the order stated, to effect sealing down of the said butt portion to its underlying surface, said band being covered with a layer of crystals of common salt whereby to prevent sticking together of adjacent shingles when a number of such shingles are packed in bundles for storage and shipment.

9. A flexible shingle of the asphalt coated and mineral surfaced type and of a form in which its exposed butt is normally free to be elevated by wind when a number of such shingles are laid in overlapping courses, said shingle having a narrow band of a heat-sensitive asphalt on the bottom face of said butt portion adjacent the lower edge thereof, the said asphalt being relatively non-adhesive at normal atmospheric temperatures, but sufficiently heat sensitive to have strong adhesive properties at temperatures of the order of 125° F., whereby when a number of said shingles are applied to a roof or other surface in overlapping courses the said adhesive properties of the asphalt will become activated promptly upon the occurrence of temperatures of the order stated, to effect sealing down of the said butt portion to its underlying surface, and a film of a parting substance applied to one of the surfaces of the shingle in a position to be in contact with the said band of an adjacent shingle when a number of such shingles are arranged in bundles for storage and shipment but to be concealed from view when a number of such shingles are applied in overlapping courses to a roof or the like.

10. A flexible shingle of the asphalt coated and mineral surfaced type and of a form in which its exposed butt is normally free to be elevated by wind when a number of such shingles are laid in overlapping courses, said shingle having a narrow band of a heat-sensitive asphalt on the bottom face of said butt portion adjacent the lower edge thereof, the said asphalt being relatively non-adhesive at normal atmospheric temperatures, but sufficiently heat sensitive to have strong adhesive properties at temperatures of the order of 125° F., whereby when a number of said shingles are applied to a roof or other surface in overlapping courses the said adhesive properties of the asphalt will become activated promptly upon the ocurrence of temperatures of the order stated, to effect sealing down of the said butt portion to its underlying surface, and a film of a parting substance on the upper face of the shingle adjacent the upper edge thereof, whereby when a number of said shingles are arranged in bundles in alternately reversed position, the said film will be in contact with the said band of an adjacent shingle in the bundle to prevent the latter from causing sticking together of the shingles composing the bundle.

11. A shingle as defined in claim 9, wherein said parting substance comprises the deposit of a slurry of clay in water.

12. A shingle as defined in claim 10, wherein said parting substance comprises the deposit of a slurry of clay in water.

13. A flexible shingle of the class described having along the bottom surface of its butt portion a band of asphalt of substantially the following physical characteristics:

| | |
|---|---|
| Melt point _____°F__ | 160–170 |
| Penetration at 32° F_____ | 3 |
| Penetration at 77° F_____ | 5–8 |
| Penetration at 115° F_____ | 20–25 |
| Viscosity, Saybolt furol at 300° F__secs__ | 300–330 |
| Viscosity, Saybolt furol at 350° F__secs__ | 75–80 | whereby to effect sealing down of the butt portion of the shingles to its underlying surface when temperatures of the order of 125° F. are attained after the shingles are applied in overlapping courses.

14. A shingle as defined in claim 13, wherein said band is covered with a layer of a fugitive material to prevent sticking together of adjacent shingles when a number of such shingles are packaged in bundles for storage and shipment, said fugitive material being of the character to become readily removed from said band upon exposure to the weather.

15. A shingle as defined in claim 13 and having a film of a parting substance on its upper face adjacent the upper edge thereof, said last named film being adapted to prevent sticking together of adjacent shingles when a number of the shingles are arranged in bundles for storage and shipment.

16. A flexible shingle of the asphalt composition type and of a form in which its exposed butt is normally free to be elevated by wind when a number of such shingles are laid in overlapping courses, said shingle having a band of adhesive material applied to the bottom face of the butt portion of the shingle, the heat and pressure sensitivity of the adhesive material being such that it is relatively non-adhesive at normal atmospheric temperatures, but capable of having its adhesive properties energized at temperatures of the order of 125° F., said band being located in a position to effect adhesion of said butt portion to its underlying surface when a number of said shingles are laid in overlapping courses and subjected to a temperature sufficient to energize the adhesive qualities of said material as aforesaid, and means associated with said band of adhesive material to prevent the same from causing sticking together of one such shingle to another while packed in bundles during storage and shipment without interfering with said adhesion when the shingles are laid in overlapping courses.

17. A flexible shingle of the class described having along the bottom surface of its butt portion a band of adhesive material, the heat and pressure sensitivity of the adhesive material being substantially like those of an asphalt having approximately the following physical characteristics:

| | |
|---|---|
| Melt point _____°F__ | 160–170 |
| Penetration at 32° F_____ | 3 |
| Penetration at 77° F_____ | 5–8 |
| Penetration at 115° F_____ | 20–25 |
| Viscosity, Saybolt furol at 300° F__secs__ | 300–330 |
| Viscosity, Saybolt furol at 350° F__secs__ | 75–80 | whereby to effect sealing down of the butt portion of the shingles to its underlying surface when temperatures of the order of 125° F. are attained after the shingles are applied in overlapping courses.

LESTER KIRSCHBRAUN.